Patented June 20, 1944

2,351,954

UNITED STATES PATENT OFFICE 2,351,954

ENZYMIC PROCESS

Herbert C. Gore and Charles N. Frey, Scarsdale, N. Y., assignors to Standard Brands Incorporated, New York, N. Y., a corporation of Delaware No Drawing. Application November 9, 1939, Serial No. 303,624

8 Claims. (Cl. 195—17)

The invention relates to a process for augmenting enzymic activity, and to a composition therefor. More particularly, it pertains to the action of a diastatic enzyme on starch, and includes correlated improvements and discoveries whereby such action is enhanced.

An object of the invention is to provide a procedure in accordance with which enzymic conversion of starch may be facilitated.

A further object of the invention is the provision of a process whereby conversion of starch may be readily, efficiently and economically effected both in small and large quantities.

An additional object of the invention is to provide a combination of procedural steps which lead to an increase in the activity of diastatic enzymes and a composition for accomplishing such augmented activity.

Other objects of the invention will in part be obvious and will in part appear hereinafter.

The invention accordingly comprises the several steps and the relation of one or more of such steps with respect to each of the others thereof, and the composition of matter possessing the features, properties, and the relation of constitutents which will be exemplified in the process and product hereinafter disclosed, and the scope of the invention will be indicated in the claims.

In the practice of the invention the activity of a diastatic enzyme and the conversion of starch therewith are advantageously effected by conducting the action in the presence of an activator. This activator may be a composition which contains a member of the group consisting of a soy bean flour and a wheat flour and a buffer salt. As a buffer salt utilization may be made of a salt of an inorganic or an organic acid, as the sodium, potassium and ammonium salts of phosphoric, acetic, propionic and citric acids.

A satisfactory composition for the activator has been found to be soy bean flour and sodium acetate. The sodium acetate serves to prevent the diastatic enzyme from being inactivated or destroyed by either a too high acidity or a too great an alkalinity. The effect of the soy bean is definite and is considered to arise from a prevention or inhibition of absorpton of the enzyme which thereby keeps it in suspension and, accordingly, at its full activity. Further, the soy bean contains small amounts of a saccharifying enzyme, of a liquefying enzyme, and of a proteolytic enzyme, and hence all of the functions of these enzymes are combined in the action which brings about an augmentation in diastatic enzyme conversion of starch.

As an illustrative example of a manner in which the invention may be practiced, the following is presented: Soy bean flour, defatted and having a Lintner value of about 140°, is admixed with finely ground sodium acetate (NaC₂H₃O₂.3H₂O) 

in substantially equal parts, and the mixture sifted a sufficient number of times to attain uniformity. A mash may be prepared by utilizing a tapioca flour with whch there has been incorporated a malt or other source of diastic enzyme, and the mixture placed in an apparatus ordinarily used for the making of a malt extract. The mixture may then be heated, with stirring, to about 70° C., for a period suitable, e. g. 10–15 minutes, to give a product having the desired consistency, and then to about 90° C. to destroy the enzyme, whereupon it is cooled to about 70° C., and run into a suitable viscosimeter.

A similar composition was prepared, and to it was added 1% of the above mentioned activator containing equal parts of defatted soy bean flour and sodium acetate. The manner of heating, with stirring, was the same in this case, and the results are given in the following tabulation:

| | Flour, g. | Water, cc. | Activator, g. | Viscosimeter, seconds |
|---|---|---|---|---|
| No activator | 100 | 400 | 0 | 38 |
| Activator used | 100 | 400 | 1 | 35 |

The mixture which did not contain activator whitened slightly on cooling and also thickened, but that to which the activator had been added whitened only very slightly on cooling and did not thicken.

A satisfactory mode of procedure is to add the activator to the starch and water, and when these have been thoroughly admixed then include the diastatic enzyme. Usually the amount of activator is about 1% of the weight of the starch. However, this amount may be somewhat greater or somewhat less, but wholly satisfactory results are not to be looked for in the event that the activator is used in an amount less than 0.25%. Moreover, an amount of the inorganic or organic acid salt, as sodium acetate, should be sufficient to buffer the mixture and keep the pH value within the range of 4.6 to 6.0. Further, it will be realized that although equal amounts of protein material, as soy bean flour, and buffer salt, as sodium acetate are given hereinbefore, nevertheless these proportions may be varied considerably, without departing from the scope of the invention, such as, for example, from about 30% to about 65% of protein material and directly relative thereto from about 65% to about 30% of buffer salt.

The foregoing procedure effects an augmentation in the diastatic conversion of starch by, it is believed, preventing a partial inactivation of the diastatic enzyme which appears to take place and to be due to the presence in a starch containing substance, as tapioca flour or corn starch, in small and varying amounts, of an inactivating substance. It is deemed that such substance combines with the diastase and prevents it from exercising its full effect. The amount of diastatic enzyme is relatively small, and hence only small amounts of a combining substance, which may be of the nature of a tannin, would be capable of inactivating the diastase, but when a protein substance, as soy bean flour, is incorporated with the mash, it is considered that the tannin or other inactivating substance combines with it and thus prevents inhibition or inactivation of the diastase. The function of the buffer salt, as sodium acetate, is to establish and maintain the pH value of the starch-water-diastase composition within a certain range, and such salts are markedly desirable and suitable inasmuch as it has been found that there is no deleterious effect upon the enzyme although ample retention of pH value attends. Moreover, a control of the pH by the operator becomes unnecessary, even though the starch-water-enzyme mixtures may vary widely in pH value.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. As a composition of matter an enzyme activator comprising defatted soy bean flour and sodium acetate in substantially equal parts.

2. A process for augmentation of enzymic activity, which comprises admixing defatted soy bean flour and sodium acetate, preparing a mixture containing starch, a diastatic enzyme containing material and water, and incorporating therewith the soy bean flour-sodium acetate admixture, heating with stirring to about 70° C., then heating to about 90° C. whereby the enzyme is destroyed, and subsequently cooling to about 70° C.

3. A process for augmentation of enzymic activity, which comprises admixing defatted soy bean flour with sodium acetate in substantially equal parts, preparing a mixture of starch and water and incorporating therewith the soy bean flour-sodium acetate mixture in an amount of about 1% of the weight of the starch, introducing a malt, heating with stirring to about 70° C. for a period of about 10 to 15 minutes, then raising the temperature to about 90° C. to destroy the malt enzyme, and subsequently cooling to about 70° C.

4. A process for augmentation of enzymic activity, which comprises admixing soy bean flour and a buffer salt, preparing a mixture containing starch, a diastatic enzyme containing material and water, and incorporating therewith the soy bean flour-buffer salt admixture, heating with stirring to about 70° C., then heating to about 90° C. whereby the enzyme is destroyed, and subsequently cooling to about 70° C.

5. A process for augmentation of enzymic activity, which comprises admixing a member of the group consisting of a soy bean flour and a wheat flour and a buffer salt, preparing a mixture containing starch, a diastatic enzyme containing material and water, and incorporating therewith the flour-buffer salt admixture, heating with stirring to about 70° C., then heating to about 90° C. whereby the enzyme is destroyed, and subsequently cooling to about 70° C.

6. As a composition of matter, an enzyme activator comprising a member of the group consisting of a soy bean flour and a wheat flour, and a buffer salt in substantially equal parts.

7. As a composition of matter, an enzyme activator comprising from about 30 to about 65% of a member of the group consisting of a soy bean flour and a wheat flour, and from about 65 to about 30% of a buffer salt.

8. A process for augmentation of enzymic activity, which comprises admixing a member of the group consisting of a soy bean flour and a wheat flour, and a buffer salt, preparing a mixture containing starch, a diastatic enzyme-containing material and water, incorporating therewith the flour-buffer salt admixture, then heating with stirring to convert the starch, raising the temperature to destroy the enzyme, and subsequently cooling.

HERBERT C. GORE.
CHARLES N. FREY.